(12) United States Patent
Schrier et al.

(10) Patent No.: US 8,186,214 B2
(45) Date of Patent: May 29, 2012

(54) METHOD AND DEVICE FOR DETERMINING THE LEVEL L OF A LIQUID WITHIN A SPECIFIED MEASURING RANGE BY MEANS OF RADAR SIGNALS TRANSMITTED TO THE LIQUID SURFACE AND RADAR SIGNALS REFLECTED FROM THE LIQUID SURFACE

(75) Inventors: Ronald C. Schrier, Delft (NL); Bin Sai, Den Haag (NL)

(73) Assignee: Enraf B.V., Delft (NL)

( * ) Notice: Subject to any disclaimer, the term of this patent is extended or adjusted under 35 U.S.C. 154(b) by 122 days.

(21) Appl. No.: 12/676,428

(22) PCT Filed: Sep. 1, 2008

(86) PCT No.: PCT/NL2008/000196
§ 371 (c)(1),
(2), (4) Date: Mar. 4, 2010

(87) PCT Pub. No.: WO2009/031884
PCT Pub. Date: Mar. 12, 2009

(65) Prior Publication Data
US 2010/0175470 A1    Jul. 15, 2010

(30) Foreign Application Priority Data
Sep. 4, 2007 (NL) ..................................... 1034327

(51) Int. Cl.
*G01F 23/00* (2006.01)
(52) U.S. Cl. .................................................. 73/290 R
(58) Field of Classification Search .................. 702/55; 73/290 R–290 V
See application file for complete search history.

(56) References Cited

U.S. PATENT DOCUMENTS
3,217,267 A    11/1965 Loposer
(Continued)

FOREIGN PATENT DOCUMENTS
DE    296 08 551 U1    7/1996
(Continued)

OTHER PUBLICATIONS

Notification of Transmittal of the International Search Report and the Written Opinion of the International Searching Authority, or the Declaration dated Oct. 28, 2008 in connection with PCT Patent Application No. PCT/NL2008/000196.

(Continued)

*Primary Examiner* — Hezron E Williams
*Assistant Examiner* — Jamar Ray

(57) ABSTRACT

The invention relates to a method for determining the level L of a liquid within a specified measuring range by means of radar signals transmitted to the liquid surface and radar signals reflected from the liquid surface, comprising the steps of i) transmitting radar signals to the liquid surface in time sequence; ii) receiving radar signals reflected from the liquid surface in time sequence; iii) determining the level L partially on the basis the transmitted radar signals and the reflected radar signals. The invention further relates to a device for determining the level L of a liquid within a specified measuring range, at least comprising a radar antenna disposed above the liquid for transmitting radar signals to the liquid and receiving radar signals reflected from the liquid surface, as well as means for determining the liquid level L on the basis of the transmitted radar signals and the reflected radar signals.

21 Claims, 5 Drawing Sheets

U.S. PATENT DOCUMENTS

Figure 1:
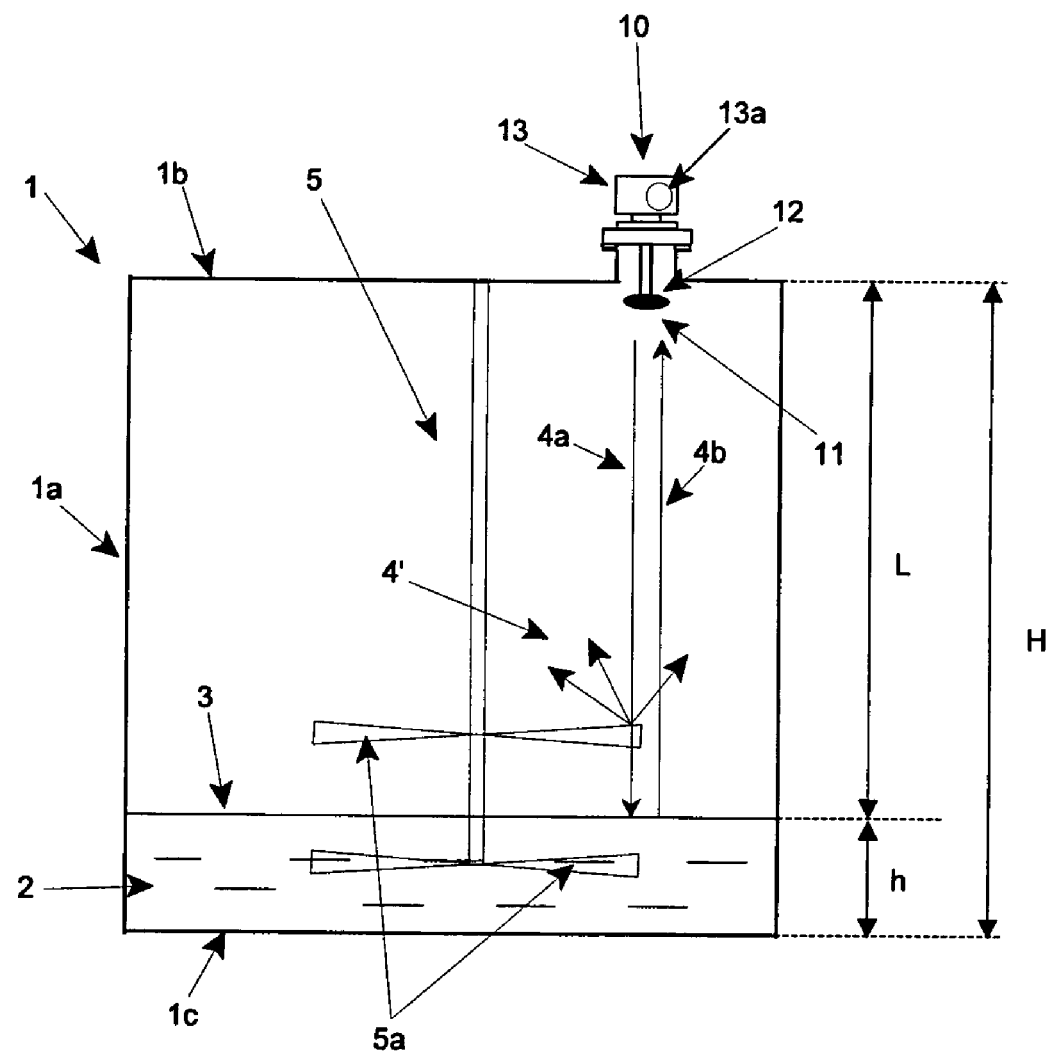

| Number | Date | Inventor |
|---|---|---|
| 3,337,814 A | 8/1967 | Brase et al. |
| 3,353,104 A | 11/1967 | Loposer |
| 3,579,281 A | 5/1971 | Kam et al. |
| 3,789,302 A | 1/1974 | Rearwin et al. |
| 3,903,482 A | 9/1975 | Pausini et al. |
| 4,000,476 A | 12/1976 | Walker et al. |
| 4,024,464 A | 5/1977 | Underhill et al. |
| 4,027,274 A | 5/1977 | Fukui et al. |
| 4,068,199 A | 1/1978 | Madoff |
| 4,072,947 A | 2/1978 | Johnson |
| 4,114,110 A | 9/1978 | Nossen |
| 4,361,801 A | 11/1982 | Meyer et al. |
| 4,451,930 A | 5/1984 | Chapman et al. |
| 4,510,461 A | 4/1985 | Dickes et al. |
| 4,516,084 A | 5/1985 | Crowley |
| 4,567,448 A | 1/1986 | Ikeda |
| 4,675,617 A | 6/1987 | Martin |
| 4,691,176 A | 9/1987 | Hsiung et al. |
| 4,800,341 A | 1/1989 | Johnson |
| 4,823,399 A | 4/1989 | George |
| 4,868,494 A | 9/1989 | Ryder et al. |
| 4,958,228 A | 9/1990 | Kutsuki |
| 4,972,160 A | 11/1990 | Sylvain |
| 5,027,526 A | 7/1991 | Crane |
| 5,034,703 A | 7/1991 | Schumacher |
| 5,036,291 A | 7/1991 | Marz |
| 5,052,028 A | 9/1991 | Zwack |
| 5,210,539 A | 5/1993 | Voyce |
| 5,270,669 A | 12/1993 | Jokura |
| 5,400,253 A | 3/1995 | O'Connor |
| 5,406,842 A | 4/1995 | Locke |
| 5,428,361 A | 6/1995 | Hightower et al. |
| 5,442,359 A | 8/1995 | Rubin |
| 5,446,416 A | 8/1995 | Lin et al. |
| 5,572,167 A | 11/1996 | Alder et al. |
| 5,708,424 A | 1/1998 | Orlando et al. |
| 5,734,302 A | 3/1998 | Teng et al. |
| 5,773,913 A | 6/1998 | Casselden |
| 5,774,089 A | 6/1998 | Bamler et al. |
| 5,923,284 A | 7/1999 | Artis et al. |
| 5,994,905 A | 11/1999 | Franchville |
| 6,107,957 A * | 8/2000 | Cramer et al. ............... 342/124 |
| 6,114,987 A | 9/2000 | Bjornholt |
| 6,374,187 B1 | 4/2002 | Knight et al. |
| 6,404,288 B1 | 6/2002 | Bietz et al. |
| 6,621,449 B1 | 9/2003 | Kunert |
| 6,629,458 B1 | 10/2003 | Westerling et al. |
| 6,636,575 B1 | 10/2003 | Ott |
| 6,662,649 B1 | 12/2003 | Knight et al. |
| 6,671,500 B2 | 12/2003 | Damgaard et al. |
| 6,762,634 B1 | 7/2004 | Hattori |
| 6,774,732 B1 | 8/2004 | Harnishfeger et al. |
| 6,876,261 B2 | 4/2005 | Gumm |
| 7,135,870 B2 | 11/2006 | Mohajer et al. |
| 7,891,229 B2 | 2/2011 | Sai |
| 2002/0101373 A1* | 8/2002 | Arndt et al. ............... 342/124 |
| 2002/0183030 A1 | 12/2002 | Damgaard et al. |
| 2003/0167839 A1 | 9/2003 | Burger et al. |
| 2004/0196177 A1 | 10/2004 | Billington et al. |
| 2004/0207477 A1 | 10/2004 | Gumm |
| 2005/0052314 A1 | 3/2005 | Spanke et al. |
| 2005/0190098 A1 | 9/2005 | Bridgelall et al. |
| 2005/0206555 A1 | 9/2005 | Bridgelall et al. |
| 2006/0044145 A1 | 3/2006 | Akerstrom et al. |
| 2006/0044147 A1 | 3/2006 | Knox et al. |
| 2006/0143000 A1 | 6/2006 | Setoguchi |
| 2007/0109177 A1 | 5/2007 | Baath et al. |
| 2010/0002912 A1 | 1/2010 | Solinsky |
| 2010/0037673 A1 | 2/2010 | Wicht et al. |
| 2010/0066589 A1 | 3/2010 | Sai et al. |
| 2010/0070207 A1 | 3/2010 | Sai |
| 2010/0070209 A1 | 3/2010 | Sai |
| 2010/0241369 A1 | 9/2010 | Wicht et al. |
| 2011/0163910 A1 | 7/2011 | Sai |

FOREIGN PATENT DOCUMENTS

| | | |
|---|---|---|
| DE | 100 40 180 A1 | 4/2002 |
| DE | 10 2004 061449 A1 | 6/2006 |
| DE | 10 2005 019 095 A1 | 10/2006 |
| EP | 0 573 034 A | 12/1993 |
| EP | 0 887 658 A | 12/1998 |
| GB | 2 064 188 A | 6/1981 |
| GB | 2 342 995 A | 4/2000 |
| WO | WO 98/12514 A1 | 3/1998 |
| WO | WO 2004/018978 A1 | 3/2004 |
| WO | WO 2004/053521 A1 | 6/2004 |
| WO | WO 2007/053007 A1 | 5/2007 |
| WO | WO 2007/111498 A2 | 10/2007 |
| WO | WO 2008/010702 A1 | 1/2008 |
| WO | WO 2008/104967 A2 | 9/2008 |
| WO | WO 2010/019427 A2 | 2/2010 |

OTHER PUBLICATIONS

Bai Sin, et al., "Advanced High Precision Radar Gauge for Industrial Applications", Proceedings of the 2006 CIE International Conference on Radar, vol. 1, Oct. 16, 2006, pp. 463-466.

"HERMetic Sensor", Honeywell Enraf, (no month) 2007, 5 pages.

"Servo Gauge 854ATG" Product Sheet, Enraf B.V., May 2008, 4 pages.

"Starrett Digitape 25", 1999 and possibly earlier, 4 pages.

European Search Report dated Aug. 17, 2010 in connection with European Patent Application No. EP 10 15 5559.

International Standard, Petroleum and liquid petroleum products—Measurement of level and temperature in storage tanks by automatic methods, Part 3: Measurement of level in pressurized storage tanks (non-refrigerated), 1st Edition, Nov. 15, 2002, 21 pages.

"Level sensor", wikipedia.org, Aug. 2, 2008, 8 pages.

Communication pursuant to Article 94(3) EPC dated Jan. 11, 2010 in connection with European Patent Application No. EP 09169534.

European Search Report dated Dec. 14, 2009 in connection with European Patent Application No. EP 09169534.

* cited by examiner

METHOD AND DEVICE FOR DETERMINING THE LEVEL L OF A LIQUID WITHIN A SPECIFIED MEASURING RANGE BY MEANS OF RADAR SIGNALS TRANSMITTED TO THE LIQUID SURFACE AND RADAR SIGNALS REFLECTED FROM THE LIQUID SURFACE

CROSS-REFERENCE TO RELATED APPLICATIONS

This application claims priority to International Patent Application No. PCT/NL2008/000196 filed on Sep. 1, 2008, which claims priority to Netherlands Patent Application No. 1034327 filed on Sep. 4, 2007. Both applications are hereby incorporated by reference.

DESCRIPTION

The invention relates to a method for determining the level L of a liquid within a specified measuring range by means of radar signals transmitted to the liquid surface and radar signals reflected from the liquid surface, comprising the steps of
i) transmitting radar signals to the liquid surface in time sequence;
ii) receiving radar signals reflected from the liquid surface in time sequence;
iii) determining the level L partially on the basis the transmitted radar signals and the reflected radar signals.

The invention further relates to a device for determining the level L of a liquid within a specified measuring range, at least comprising a radar antenna disposed above the liquid for transmitting radar signals to the liquid and receiving radar signals reflected from the liquid surface, as well as means for determining the liquid level L on the basis of the transmitted radar signals and the reflected radar signals.

Radar (Radio Detection And Ranging) is widely used for contactless distance measurement. A very well-known principle is the time difference method. According to this method, a radar antenna transmits a radar signal which strikes an object, for example a liquid surface. The object reflects part of the transmitted radar signal/wave back in the direction of the radar antenna, which receives the reflected radar signal/wave.

Although it is possible to use separate radar antennas for the transmitted radar signal and for the reflected radar signal, it is common practice to use the same radar antenna for transmitting as well as for receiving. The radar system measures the time difference $\Delta t$ between the transmitted radar signal and the received radar signal. If the velocity of the transmitted radar signal is known, the distance to the surface of the liquid can be determined in a simple manner, using suitable measuring means.

A device as referred to in the introduction, which uses the above measuring principle, is frequently used for accurately determining the level of a liquid, for example water or oil, in a storage tank in the process industry or in an oil refinery by means of radar signals. The radar signals that are used are generally pulsed radar signals.

Another measuring method, which is frequently used in the industry, is based on determining the difference frequency between transmitted radar signals and received radar signals.

Yet another, much more accurate, method is based on the phase difference between transmitted radar signals and received radar signals, wherein also the whole number of wavelengths travelled by the radar waves (the wrapping factor k) is known (after calibration against a reference value). When this calculation method is used, the level cannot be uniquely determined any more in case of a fluctuation of more than a quarter wavelength between two successive measurements, so that a reliable measuring result can no longer be obtained. Due to this unreliability and the uncertainty as regards the measured phase difference, it is not possible to determine an unequivocal and reliable value of the actual level of the liquid in the case of strong or rapid liquid level fluctuations.

The object of the method according to the invention is to obviate the above drawback and to introduce a more accurate measuring principle, in which the aforesaid unforeseen fluctuations in the liquid level are taken into account.

According to the invention, the method is to that end further characterised by the steps of
iv) simultaneously carrying out step iii) on the basis of two different calculating methods, wherein
the first calculation method generates a measured value L1 of the level L with a first error $\Delta r_1$ and the second calculation method generates a measured value L2 of the level L with a second error $\Delta r_2$, and wherein
the first calculation method is more sensitive to systematic deviations than the second calculation method, and the second calculation method is more sensitive to strong fluctuations in the liquid level L than the first calculation method, as well as
v) analysing fluctuations in the liquid level L in time sequence, and
vi) using or utilising the first or the second calculation method for determining the level L in dependence on the fluctuations in the liquid level L as determined in step v).

In this way, it is readily possible to switch over to a measuring method exhibiting a different degree of inaccuracy in case of unwished-for distortions of the liquid surface, thus preventing the risk of incorrect measured values being obtained when the previously used measuring technique is employed. By switching over to a different measuring method, the overall accuracy of the measuring system as mounted in the storage tank can be ensured so as to obtain more or less accurate level measurements.

More specifically, the method according to the invention is characterised in that the first calculation method determines the time difference $\Delta t$ between the transmitted radar signals and the received radar signals and calculates the measured value L1 of the level L on the basis thereof. In another embodiment, the first calculation method determines the difference frequency $\Delta f$ between the transmitted radar signals and the received radar signals and calculates the measured value L1 of the level L on the basis thereof, whilst in yet another embodiment the first calculation method determines a series of phase differences $\Delta \phi$ between the transmitted radar signals and the received radar signals, and subsequently calculates the measured value L1 of the level L on the basis thereof.

The above measuring methods are satisfactory in practice, but they are sensitive to, for example, interference of radar signals in the storage tank caused by reflections.

According to the invention, the method is further characterised in that the second calculation method determines the phase difference $\Delta \phi$ between the transmitted radar signals and the received radar signals, as well as the whole number of wavelengths $\lambda$ travelled by the radar waves, being the wrapping factor k, and calculates the measured value L2 of the level L on the basis thereof.

A functional embodiment of the method is further characterised in that with a view to determining in step vi) whether the first or the second calculation method is to be used, step v) comprises the sub-steps of v-1) calculating the phase difference $\Delta\psi$ ($\psi=\Delta\phi$) between successive measurements, and v-2) comparing said calculated phase difference $\Delta\psi$ with a predetermined maximum allowable value $\Delta\psi_{max}$.

What applies in particular in that case is that if $\Delta\psi_m > \Delta\psi_{max}$, the first calculation method for determining the level L is used, and that if $\Delta\psi_m < \Delta\psi_{max}$, the second calculation method for determining the level L is used, whilst the measuring results of the second calculation method are recalibrated against the first calculation method for the unique calculation of the measured value L2 with the second error $\Delta r_2$.

In this way the measuring method and the measuring device can be set as desired, such that a switchover is made to another measuring method exhibiting a higher or, on the contrary, a lower degree of inaccuracy in dependence on distortions of the liquid surface. As a result, the performance of the measuring device in the storage tank can be set as desired for determining the liquid level with a high or a low degree of inaccuracy.

Another special embodiment of the method according to the invention is characterised in that, prior to steps i)-vi), the maximum and the minimum difference between the measured values L1 and L2 generated with the first and the second calculation method is determined for each value of the level L over at least part of the measuring range, without any strong fluctuations in the liquid level, and stored in a table.

At least said part of the measuring range may be divided into one or more subranges of a suitably selected magnitude in that case. More specifically, according to the invention, in order to achieve a correct recalibration of the measuring results of the second calculation method against the first calibration method, successive measured values L1 must be generated by means of the first calculation method for at least one subrange, and a unique value of the wrapping factor k must be determined on the basis of the associated minimum and maximum difference values stored in the table between the measured values L1 and L2.

These steps are carried out for the purpose of determining when the measuring method or the measuring device must switch back from one measuring system exhibiting the high degree of inaccuracy to the second measuring system exhibiting the lower degree of inaccuracy. In this way a calibration point can be effectively determined for every value of the level L within the measuring range, on the basis of which the measuring method can conclude how the level measurement is to be continued in case of a switchover from one measuring system to the other measuring system.

The device for determining the level L of a liquid within a specified measuring range according to the invention comprises at least one radar antenna disposed above the liquid for transmitting radar signals to the liquid and receiving radar signals reflected from the liquid surface, as well as means for determining the liquid level L on the basis of the transmitted radar signals and the reflected radar signals. According to the invention, said determining means are arranged for simultaneously carrying out two different calculation methods for generating a measured value L1 with a first error $\Delta r_1$ and a measured value L2 with a second error $\Delta r_2$, and for analysing fluctuations in the liquid level L in time sequence, and using or utilising the first or the second calculation method for determining the level L in dependence on the fluctuations in the liquid level L as determined by the determining means.

More specifically, the determining means, with a view to carrying out the first calculation method, are arranged for determining the time difference $\Delta t$ between the transmitted radar signals and the received radar signals and calculating the measured value L1 of the level L on the basis thereof.

In another embodiment of the device according to the invention, the determining means, with a view to carrying out the first calculation method, are furthermore arranged for determining the difference frequency $\Delta f$ between the transmitted radar signals and the received radar signals and calculating the measured value L1 of the level L on the basis thereof.

In another embodiment of the device according to the invention, the determining means, with a view to carrying out the first calculation method, may on the other hand be arranged for determining a series of phase differences $\Delta\phi$ between the transmitted radar signals and the received radar signals and calculating the measured value L1 of the level L on the basis thereof.

The above measuring methods are satisfactory in practice, but they are sensitive to, for example, interference from radar signals in the storage tank caused by reflections.

According to the invention, the determining means, with a view to carrying out the second calculation method, may furthermore be arranged for determining the phase difference $\Delta\phi$ between the transmitted radar signals and the received radar signals, as well as of the whole number wavelengths $\lambda$ travelled by the radar waves, being the wrapping factor k, and calculating the measured value L2 of the level L on the basis thereof, wherein, the determining means, with a view to determining whether the first or the second calculation method must be used, are arranged for calculating the phase difference $\Delta\psi$ between successive measurements and comparing said calculated phase difference $\Delta\psi_m$ with a predetermined maximum allowable value $\Delta\psi_{max}$.

The method and the device according to the invention will now be explained in more detail with reference to the drawings.

As already explained in the foregoing, the invention relates to a method for determining the level of a liquid in a reliable and highly accurate manner. The method uses radar signals for determining the level of a product stored in, for example, a storage tank, wherein all kinds of obstacles or parts present in the tank do not interfere with the measuring method.

A well-known principle for level measurement is to use pulsed radar signals. FIG. 1 schematically shows a device for determining the level of the liquid in a tank in accordance with this known measuring principle. The device 10 is disposed in the upper part of a tank 1, which is built up of walls 1a, a roof 1b and a bottom 1c. The height of the tank 1 is indicated by the letter H.

The tank 1 contains an amount of liquid 2, and the height of the liquid surface 3 being indicated by the letter L.

The device 10 has at least one radar antenna 12, which is provided with a transmitting surface 11 for transmitting a radar signal 4a in the direction of the liquid surface 3. The radar signal 4a is partially reflected from the liquid surface 3 and the reflected radar signal 4b is in turn intercepted by the radar antenna 12. It is also possible, of course, to use a separate antenna for transmitting the radar signals to the liquid surface and a separate receiver for intercepting the reflected radar signals.

The device 10 according to the prior art also comprises means 13 for determining the liquid level 3 (L) on the basis of the transmitted radar signal 4a and the reflected radar signal 4b, wherein the measuring system is based on the determination of the time difference $\Delta t$ between the transmitted signal pulse and the received signal pulse. Since the velocity of the radar signal is known, the distance to the measuring object or, in this case the liquid surface, can be determined on the basis of:

$$L = H - h = \tfrac{1}{2} \cdot v \cdot \Delta t \qquad (1)$$

where
H=the height of the tank [m]
L=the distance between the radar antenna and the liquid surface [m]
h=the height of the liquid surface [m]
v=the propagation velocity of the radar waves through the medium [m/sec]
Δt=the time difference between the transmitted radar signal and the reflected radar signal [sec]

A drawback of level measurement based on pulsed radar signals is that the degree of accuracy of the time measurement between the transmitted radar signal and the received radar signal must be very high. An inaccurate time measurement will inevitably result in an inaccurate level measurement. The measurement based on pulsed radar signals depends inter alia on the pulse shape of the radar signal and possibly also on the pulse amplitude. In addition to that, reflections of the radar signal from objects other than the liquid surface interfere with this method.

Figure 2:
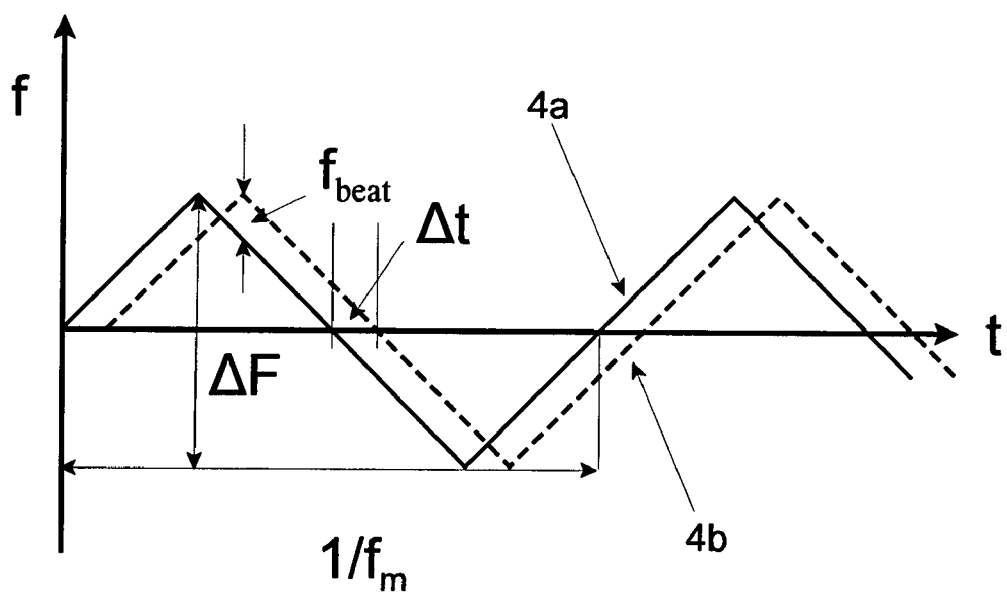

A more extensive (likewise well-known) method uses frequency modulation (Frequency Modulation Continuous-Wave radar), wherein the frequency of the radar signal changes with time. The signal may for example be triangular in shape, as shown in FIG. 2. As a result of the time delay caused by the distance to be covered between the antenna and the target surface, a frequency difference $f_{beat}$ exists between the transmitted radar signal 4a and the reflected radar signal 4b. Said frequency $f_{beat}$ constitutes the basis for the determination of the level distance L.

The FMCW technique does not have the drawbacks of the pulsed radar measurement, but it does have a number of other significant drawbacks. In the first place, heavy demands are made on the stability of the slope of the frequency sweep, which must be highly constant. In the second place it is difficult to maintain the high linearity of the sweep shape, and thus the medium frequency of the frequency band is indistinct. In the third place, the method of calculating the exact centre of the beat frequency is very sensitive to interference by reflections (indicated at 4' in FIG. 1) caused by obstacles, such as tank mixing devices (indicated at 5 in FIG. 1 and provided with stirring elements 5a), the tank bottom (1c), the tank wall (1a), ladders, heat exchangers, etc, and this may thus lead to errors in the range of a few centimeters.

In other words, the FCMW technique is very sensitive to so-called systematic deviations but less sensitive to strong fluctuations in the liquid level L.

An alternative, likewise well-known measuring technique is referred to as Stepped-Frequency Continuous-Wave (SF-CW) has been developed. The SF-CW radar method transmits and receives a series of sinusoidal signals at discrete frequencies that fill the frequency band. The phase difference $\Delta\phi_t$ between the transmitted signals and the received radar signals is determined, which value forms the basis for the determination of the level distance L.

This actual phase difference $\Delta\phi_t$ cannot be measured directly by means of a radar instrument, due in part to the phase indistinctness $2\pi$. The measured phase difference is represented as $\Delta\phi_w$. The phase signal is measured and represented as a sinus signal, equal to $\cos(\Delta\phi_w)$ or $\sin(\Delta\phi_w)$. Sin $(\Delta\phi)=\sin(\Delta\phi+2k\pi)$ in that case, k being an integer. Since the exact value k is not known, the measurement will be inaccurate as well. The factor k is the so-called 'wrapping' factor and results in a phase indistinctness in 'wrapped phase' $\Delta\phi_w$.

In RADAR-based level measurement devices, which operate predominantly in the frequency bandwidth of 8-12.5 Ghz (the X-band), a frequency of 10 GHz corresponds to a wavelength λ that equals 30 mm in vacuum. If the wrapping factor k unintentionally changes by 1, this corresponds to a distance change of 15 mm, but the level measurement is no longer accurate. The wrapping factor k is of major importance for an accurate measurement of the level distance L, therefore.

The SF-CW radar method obviates the phase ambiguity by measuring the phase difference at a number of different frequencies. This renders the SF-CW technique less sensitive to strong fluctuations in the liquid level L, but at the same time it leads to an increased sensitivity to systematic deviations, as described with reference to the FMCW technique.

The method according to the invention, however, makes use of the ambiguous phase measurement and attempts to neutralise the measuring error resulting from strong level fluctuations temporarily or permanently. It is desirable, however, to carry out the level measurement in the storage tank by means of a measuring method which exhibits a low degree of inaccuracy. Although the accurate phase-based method, whose sensitive measuring range leads to accurate level measurements, is used for this purpose, the measuring results may sooner take place outside the specified measuring range in case of a distortion of the liquid surface, so that the reference point of the measuring method (the wrapping factor k of the phase measurement) is lost.

Figure 3:
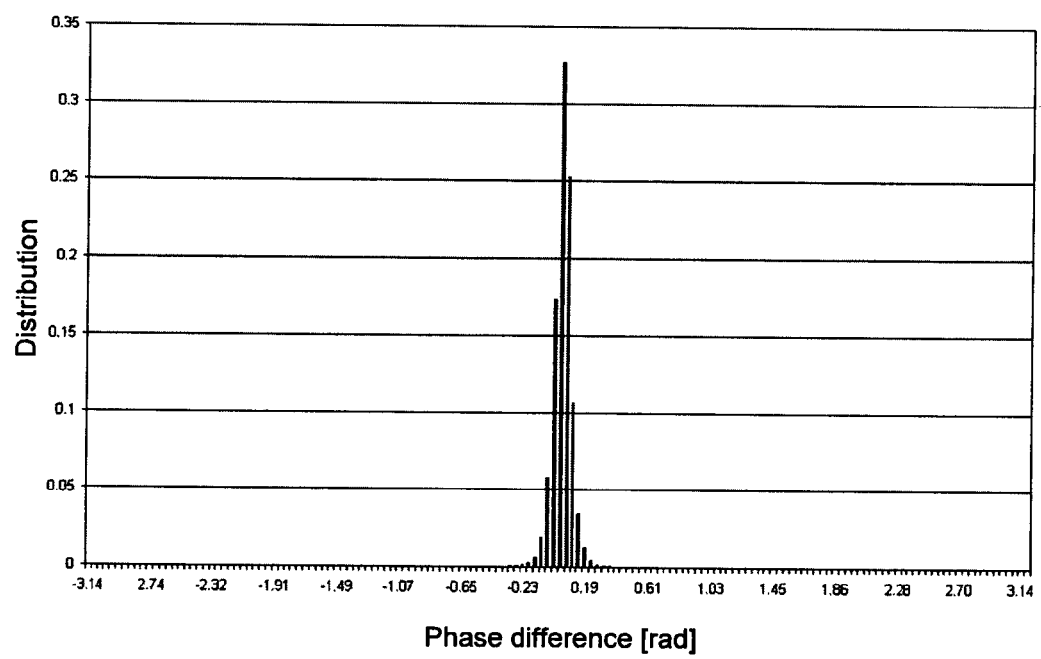
Figure 4:
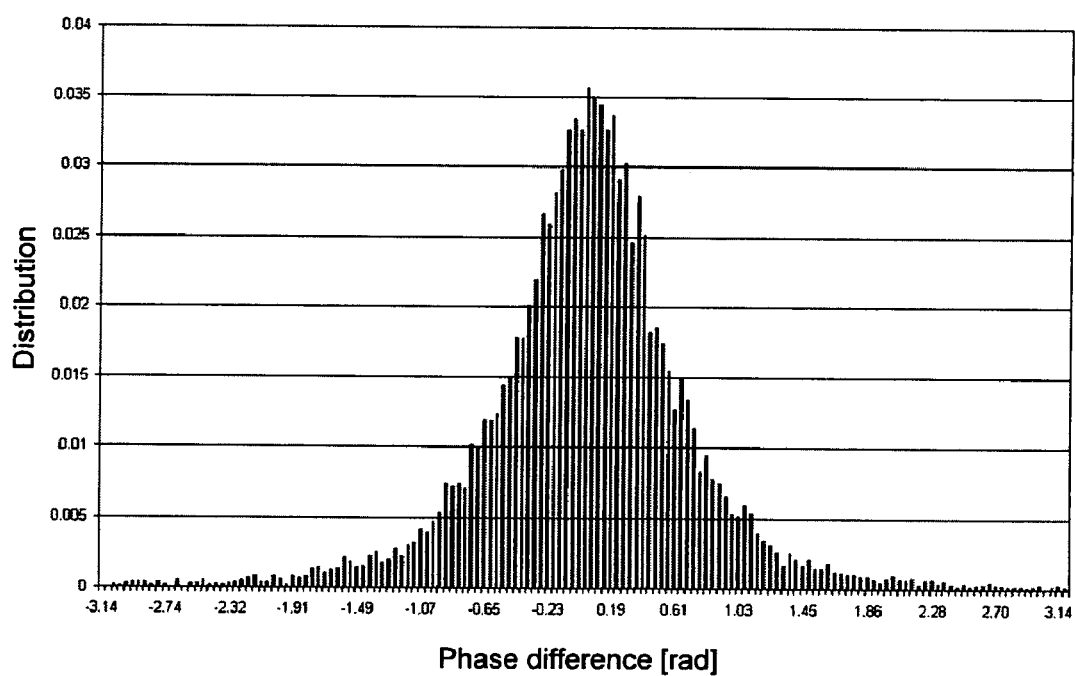

During the phase measurement there is a danger that the measurement will jump one complete wavelength under the influence of level fluctuations, which, in the case of a frequency of 10 Ghz, corresponds to a distance of about 15 mm from the ring. Such a measuring error is undesirable in a measuring method that is intended to be accurate, as it affects the performance thereof. All this is shown in FIGS. 3 and 4, with FIG. 3 showing the distribution of phase differences in a level measurement under normal circumstances. When the liquid surface in the storage tank is only distorted to a minor extent, the liquid thus forms a sufficiently flat reflective surface for the transmitted radar signals, so that a distinct signal peak is detected in the reflected radar signal by means of the phase measurement.

The single, narrow peak in the diagram of FIG. 3 indicates that there are hardly any distortions of the liquid surface and represents normal operating conditions (in the storage tank), therefore. Using a phase measurement method, it is thus possible to determine the liquid level in the storage tank in a very reliable and accurate manner (with the correct wrapping factor k and a small error Δr).

FIG. 4, on the other hand, shows the phase differences when the liquid surface is distorted by fluctuations. The distorted liquid surface thus does not form a substantially level reflective surface for the transmitted signals. Said distortions may for example consist of a rapidly rising or falling liquid level when the storage tank is partially emptied or filled. Such major fluctuations make it impossible to determine the actual liquid level L with a sufficient degree of accuracy when using the accurate phase measurement method.

It will be understood that in the case of rapidly fluctuating liquid levels the accumulating errors may become very large, especially if the wrapping factor k can no longer be unequivocally determined.

Due to said fluctuations, the measuring results will soon reach values outside the measuring range, as a result of which the connection between the measuring signals and the actual liquid level is lost. In FIG. 4 said fluctuations result in a peak having a larger distribution (read: a wide peak), so that the actual height of the liquid level L in the storage tank cannot be unequivocally determined.

The measuring method and the measuring device according to the invention utilise the detected fluctuations in the liquid level by switching over in certain situations to another measuring method exhibiting another, higher degree of inaccuracy than the accurate phase measurement method that is normally used. According to the method, the level measurement L is carried out by using two different calculation methods simultaneously, with the first calculation method generating a measured value L1 of the level L with a first error $\Delta r_1$ and the second calculation method generating a measured value L2 of the level L with a second error $\Delta r_2$. As already explained above, the first calculation method is more sensitive to systematic deviations than the second calculation method, and the second calculation method is more sensitive to major fluctuations in the liquid level L than the first calculation method.

According to the invention, fluctuations in the liquid level L are furthermore analysed in time sequence, with the measuring system deciding, in dependence on the detected fluctuations in the liquid level L, whether the first or the second calculation method is to be utilised for determining the level L. In other words, when significant fluctuations in the liquid level are detected, the measuring method will temporarily operate with a higher degree of inaccuracy than under normal circumstances.

The moment measuring is about to take place outside the specified measuring range under normal circumstances, for example due to major level fluctuations as take place in turbulent conditions such as a thunderstorm, or when the liquid is being quickly pumped into or out of the storage tank, the method and consequently also the measuring device are switched over to the more traditional level measurement according to the first calculation method, and all the results of the liquid level measurements obtained by means of said first calculation method will exhibit a greater (read: poorer) measuring inaccuracy.

To that end, the phase difference $\Delta\Psi$ is calculated between successive measurements and compared with a predetermined maximum allowable phase difference value $\Delta\psi_{max}$. If $\Delta\psi_m > \Delta\psi_{max}$, for example due to major level fluctuations, the first calculation method (exhibiting the higher degree of inaccuracy $\Delta r_1$) for determining the level L in the tank will be used.

The moment the measuring method or the measuring device has been switched over to the measuring system exhibiting the higher degree of inaccuracy (for example a frequency measurement), the distortion of the liquid surface is according to the invention further monitored. The moment said fluctuations take place within the specified measuring range again, the measuring system and the measuring device will according to the invention switch over to the previously used measuring method exhibiting a lower degree of inaccuracy $\Delta r_2$.

In other words, also in the less accurate measuring mode of the measuring method or device at that point in time, the phase difference $\Delta\Psi$ will be calculated between successive measurements and be compared with the predetermined maximum allowable phase difference value $\Delta\psi_{max}$. If it is found that $\Delta\psi_m < \Delta\psi_{max}$, for example because the major level fluctuations in the liquid level no longer occur (because turbulences in the liquid in the tank due to pumping operations and the like no longer occur and the liquid has settled), the first measuring method will revert to the more accurate measuring mode and use the second calculation method exhibiting the lower degree of inaccuracy $\Delta r_2$ for determining the level L.

However, because the exact value of the wrapping factor k is no longer known due the previously detected fluctuations, a correct, more accurate determination of the liquid level L2 cannot be directly and unequivocally obtained upon switching over to the second, more accurate calculation method. This makes it necessary to recalibrate the measuring results of the second calculation method against the first calculation method for the unique calculation of the measured value L2 with the first error $\Delta r_1$ for the unique calculation of the more accurate measured value L2.

Figure 5:
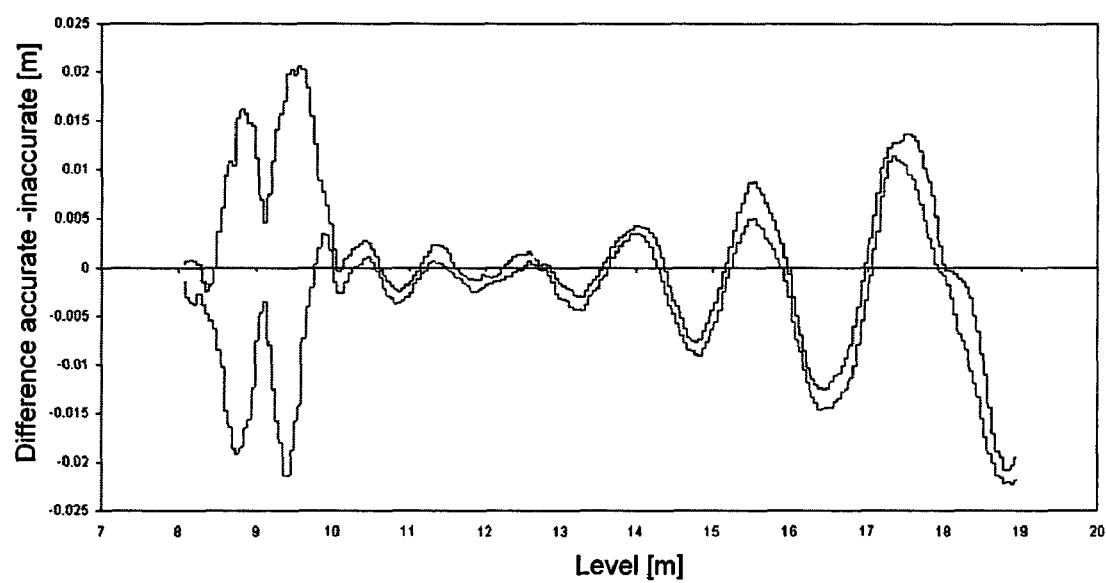

To that end, use is made of a so-called comparison table, which table is to be determined during use of the measuring method or the measuring device according to the invention, an example of which comparison table is shown in FIG. 5.

Said comparison table is drawn up automatically when the measuring device is first put into operation at the storage tank in question, which is done either by slowly filling the storage tank with a liquid or by slowly emptying it.

In either situation, the maximum and the minimum difference between the measured values L1 and L2 generated by means of the first and the second calculation method is determined over substantially the entire measuring range (which may be divided into sub-ranges or sub-segments of 5 cm, for example) or part thereof for each value of the level L and stored in a table. Said minimum and maximum difference measurements L1 and L2 for each level L over the entire measuring range (for example from the bottom to just below the upper edge of the storage tank, see FIG. 1) form an error margin envelope which extends along the horizontal axis of FIG. 5.

At least said part of the measuring range may be divided into one or more sub-ranges of a suitably selected magnitude, for example 5 cm. In the case of radar signals of 10 Ghz, a sub-range of for example 5 cm is large enough for capturing a number of wavelengths $\lambda$, large enough for limiting the size of the table and small enough for excluding other slowly changing systematic error patterns, for example resulting from interference caused by reflection of radar signals in the storage tank.

To achieve a correct recalibration of the calculation method L2 against the calculation method L1, a unique value of the wrapping factor k is determined on the basis of the minimum and maximum difference values stored in the comparison table. If an unequivocal value cannot be determined, successive measured values L2 are generated for at least one sub-range by means of the first calculation method so as to achieve a correct recalibration of the measuring results of the second calculation method L2 against the first calibration method L1.

Subsequently, after going through the entire measuring range, the associated minimum and maximum difference values stored in the table between the measured values L1 and L2 can be read out and an unique value of the wrapping factor k can be determined on the basis thereof. On the basis of the derived wrapping factor k, the actual liquid level L can be derived by means of the accurate measuring method L2.

In the comparison table of FIG. 5, the level height has been determined from the bottom to the antenna for the accurate and for the less accurate measuring method, with the measuring range being subdivided into segments of 5 cm. The minimum and the maximum difference between the less accurate measuring methods and the accurate phase measurement has been determined for each segment.

When the measuring method according to the invention is carried out by means of a measuring device according to the invention, it is possible to take into account the fact that the less accurate measurement L1 is sensitive to the Doppler effect, for which a correction must be made.

The invention claimed is:

1. A method for determining a liquid level of a liquid within a specified measuring range, the method comprising the steps of:
   transmitting radar signals toward a surface of the liquid in time sequence;
   receiving radar signals reflected from the liquid surface in time sequence; and
   determining the liquid level based on the transmitted radar signals and the reflected radar signals by:
      simultaneously carrying out two different calculation methods, wherein a first of the calculation methods generates a first measured value of the liquid level with a first error and a second of the calculation methods generates a second measured value of the liquid level with a second error, wherein the first calculation method is more sensitive to systematic deviations than the second calculation method, and wherein the second calculation method is more sensitive to strong fluctuations in the liquid level than the first calculation method;
      analyzing fluctuations in the liquid level in time sequence; and
      using one of the first and second measured values as the determined liquid level based on the fluctuations in the liquid level.

2. The method according to claim 1, wherein the first calculation method comprises determining a time difference between the transmitted radar signals and the reflected radar signals and calculating the first measured value based on the time difference.

3. The method according to claim 1, wherein the first calculation method comprises determining a frequency difference between the transmitted radar signals and the reflected radar signals and calculating the first measured value based on the frequency difference.

4. The method according to claim 1, wherein the first calculation method comprises determining a series of phase differences between the transmitted radar signals and the reflected radar signals and calculating the first measured value based on the series of phase differences.

5. The method according to claim 1, wherein the second calculation method comprises:
   determining a phase difference between the transmitted radar signals and the reflected radar signals;
   determining a wrapping factor comprising a whole number of wavelengths traveled by radar waves in the transmitted and reflected radar signals; and
   calculating the second measured value based on the phase difference and the wrapping factor.

6. The method according to claim 1, wherein analyzing the fluctuations in the liquid level comprises:
   calculating a phase difference between successive measurements; and
   comparing the calculated phase difference with a specified maximum allowable value.

7. The method according to claim 6, wherein, if the calculated phase difference is greater than the specified maximum allowable value, the liquid level determined by the first calculation method is selected.

8. The method according to claim 6, wherein, if the calculated phase difference is less than the specified maximum allowable value, measuring results of the second calculation method are recalibrated against the first calculation method for a unique calculation of the second measured value.

9. The method according to claim 8, further comprising:
   determining maximum and minimum difference values between measured values generated with the first and second calculation methods for each of multiple liquid levels over at least part of the measuring range, without any strong fluctuations in the liquid level; and
   storing the maximum and minimum difference values in a table.

10. The method according to claim 9, wherein the at least part of the measuring range is divided into one or more subranges.

11. The method according to claim 9, wherein a unique value of the wrapping factor is determined based on at least some of the minimum and maximum difference values stored in the table.

12. The method according to claim 10, wherein successive first measured values are generated for at least one subrange using the first calculation method, and after the at least one subrange has been entirely covered, associated minimum and maximum difference values are read out of the table, and a unique value of the wrapping factor is determined using the associated minimum and maximum difference values.

13. The method according to claim 1, wherein the first error is smaller than the second error.

14. The method according to claim 1, wherein the first error is larger than the second error.

15. A system for determining a liquid level of a liquid within a specified measuring range, the system comprising:
   at least one radar antenna configured to transmit radar signals toward the liquid and to receive radar signals reflected from a surface of the liquid; and
   a measuring device configured to determine the liquid level based on the transmitted radar signals and the reflected radar signals by:
      simultaneously performing a first calculation method for generating a first measured value of the liquid level with a first error and a second calculation method for generating a second measured value of the liquid level with a second error;
      analyzing fluctuations in the liquid level in time sequence; and
      using one of the first and second measured values as the determined liquid level based on the determined fluctuations in the liquid level.

16. The system according to claim 15, wherein the measuring device is configured to perform the first calculation method by determining a time difference between the transmitted radar signals and the reflected radar signals and calculating the first measured value based on the time difference.

17. The system according to claim 15, wherein the measuring device is configured to perform the first calculation method by determining a frequency difference between the transmitted radar signals and the reflected radar signals and calculating the first measured value based on the frequency difference.

18. The system according to claim 15, wherein the measuring device is configured to perform the first calculation method by determining a series of phase differences between the transmitted radar signals and the reflected radar signals and calculating the first measured value based on the series of phase differences.

19. The system according to claim 15, wherein the measuring device is configured to perform the second calculation method by:

determining a phase difference between the transmitted radar signals and the reflected radar signals;

determining a wrapping factor comprising a whole number of wavelengths traveled by radar waves in the transmitted and reflected radar signals; and calculating the second measured value based on the phase difference and the wrapping factor.

20. The system according to claim 19, wherein the measuring device is configured to determine whether to use the first or second measured value as the determined liquid level by calculating the phase difference between successive measurements and comparing the calculated phase difference with a specified maximum allowable value.

21. A method for determining a measured level of a liquid, the method comprising the steps of:

transmitting radar signals toward a surface of the liquid;

receiving radar signals reflected from the surface of the liquid;

analyzing fluctuations in a liquid level;

selecting one of multiple calculation methods based on the fluctuations; and using a measured value obtained by the selected calculation method as the measured level of the liquid;

wherein a first of the calculation methods generates a first measured value with a first error and a second of the calculation methods generates a second measured value with a second error; and wherein the first calculation method is more sensitive to systematic deviations than the second calculation method, and the second calculation method is more sensitive to the fluctuations in the liquid level than the first calculation method.

* * * * *